United States Patent

[11] 3,609,039

| [72] | Inventor | Kasimir Ambraschka<br>Unterhaching, Germany |
|---|---|---|
| [21] | Appl. No. | 776,961 |
| [22] | Filed | Nov. 19, 1968 |
| [45] | Patented | Sept. 28, 1971 |
| [73] | Assignee | Agfa-Gevaert Aktiengesellschaft<br>Leverkusen, Germany |
| [32] | Priority | Nov. 30, 1967 |
| [33] | | Germany |
| [31] | | A57,542 |

[54] ILLUMINATING APPARATUS
6 Claims, 1 Drawing Fig.

[52] U.S. Cl. .................................................. 355/70,
240/20, 355/113, 355/119
[51] Int. Cl. ....................................................... G03b 27/54
[50] Field of Search ........................................... 240/20;
355/119, 113, 67, 70

[56] References Cited
UNITED STATES PATENTS
2,344,558   3/1944   Moore ........................... 240/20 X FOREIGN PATENTS
164,452   11/1949   Austria ........................ 355/113
796,196   1/1936   France ........................ 355/119

Primary Examiner—Samual S. Matthews
Assistant Examiner—Richard A. Wintercorn
Attorney—Arthur O. Klein ABSTRACT: An illuminating assembly for illuminating an article such as a sheet located on a light-permeable support which forms a part of a structure used in connection with making microfilm photographs. The structure includes a light-permeable plate through which the light passes to reach the article which is to be illuminated, and on one side of this plate is situated a reflecting wall for reflecting light to the plate. A plurality of light sources extend at least in part to the side of the wall which is directed away from the plate, and a plurality of reflecting means respectively coact with the light sources for screening the latter against transmitting light directly to the plate while reflecting light therefrom to the wall to be reflected by the latter to the plate. An adjusting means is connected with the reflectors for adjusting the distance thereof with respect to the light-reflecting wall.

PATENTED SEP 28 1971    3,609,039
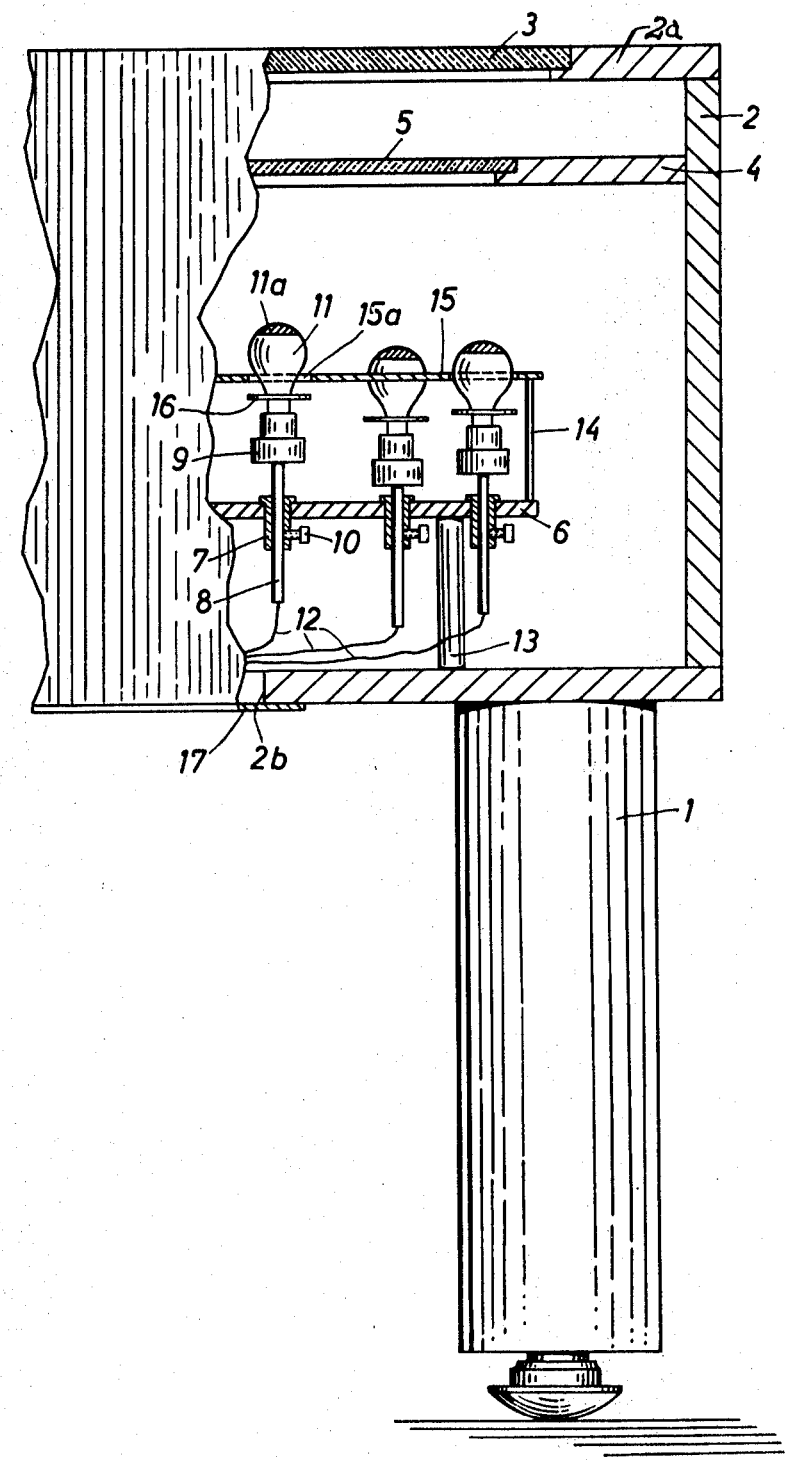
INVENTOR
KASIMIR AMBRASCHKA
BY: *Arthur O. Klein*
Attorney

ILLUMINATING APPARATUS

BACKGROUND OF THE INVENTION

The present invention relates to illuminating devices.

In particular, the present invention relates to illuminate boxes for the purpose of uniformly illuminating an object such as a sheet, for example in connection with the making of microfilm photographs.

The structures of this type generally have within the light box several light sources over which is situated a suitable light-permeable plate to support the sheet which is to be illuminated. With such structures a direct travelling of the light to the light-permeable plate from the light source is prevented by suitable reflective screens which coact with the light sources.

By means of an illuminating assembly of this latter type, particularly when there is a light-reflecting wall capable of diffusing the light, it is possible to achieve in the plane of the sheet which is to be illuminated a very uniform light distribution, However, it is important to take into consideration the fact that in order to achieve a uniform density in the negative it is essential to provide at every section of the sheet which is illuminated a light-density variation which compensates for the natural falloff of light at the edge region of the objective.

With a known illuminating assembly of this latter type, this problem has been solved by interrupting the light-reflecting wall surface at predetermined areas with light-absorbing surfaces. In this way it is possible to achieve in an accurate manner the desired variation in light density. However, the disadvantage of this latter type of construction resides in the fact that after it is once set up it can no longer be adapted to take care of lamp variations during the operation of the assembly or to be adapted to different formats of the sheet which is to be illuminated.

It has also been proposed to provide light boxes where the adaption to the fluctuating light intensity of the light sources is brought about by way of an elevational adjustment of the lamps. The possible range of adjustment which can be achieved with this known structure is, however, relatively small, and as a result of the light which directly radiates to the light-permeable plate from the light sources, it is not possible to achieve uniform light distribution capable of being provided by the type known structure referred to above.

SUMMARY OF THE INVENTION

It is accordingly a primary object of the present invention to provide an illuminating assembly of the above general type which will avoid the above drawbacks.

In particular, it is an object of the invention to provide for an assembly of this type a structure capable of being adjusted through a very wide range so as to achieve the required distribution of light.

Also, it is an object of the invention to provide a construction which will achieve the desired results without any direct illumination of the plate through which the light passes to the object to be illuminated.

Also, it is an object of the invention to provide a construction which, while relatively simple, nevertheless makes it possible to bring about changes in localized light intensity during operation of the device. Thus, it becomes possible to provide exceedingly uniform light distribution.

In accordance with the invention, the plurality of light sources extend at least in part through the side of the reflecting wall which is directed away from the light-permeable plate, and screening or shielding reflectors which prevent light from traveling directly from the light sources to the light-permeable plate are provided to direct the light from the light sources to the reflecting wall, with an adjusting means operatively connected to these reflectors for adjusting them with respect to the light-reflecting wall. Thus, in accordance with the positions of these reflectors, different amounts of light from the light sources will be reflected from the reflecting wall back toward the light-permeable plate, to achieve the required light distribution.

The range of adjustment and the maximum light output can be further increased if, according to a further feature of the invention, the light sources together with their reflectors are adjustable with respect to the reflecting wall and carry at regions directed away from the reflectors additional reflectors which surround light sources.

According to a preferred construction of the invention, the light sources simply extend through openings of the reflecting wall and are adjustable in elevation, taking the form of lamps having directed toward the light-permeable plate end regions which are mirrored so as to form the reflectors. The sockets for the lamps are respectively fixed to elongated rods which extend perpendicularly with respect to the light-permeable plate, and these rods are slidable in guide sleeves in which they may be releasably held to provide the preselected adjusted elevation for a given lamp. All of these guide sleeves are carried by a common support plate, the latter being located beneath the light-reflecting wall, while the light-reflecting wall itself is horizontal and is situated beneath and parallel to the light-permeable plate.

Moreover, it is of advantage if, in order to achieve the greatest possible uniformity in the light distribution, the reflecting wall is provided with a white, matted reflecting surface as by providing on this wall a suitable lacquer.

BRIEF DESCRIPTION OF DRAWINGS

The invention illustrated by way of example in the accompanying drawing which forms part of this application and in which one possible embodiment of a structure of the invention is shown fragmentarily in a partly sectional elevation.

DESCRIPTION OF A PREFERRED EMBODIMENT

Referring now to the drawing, the assembly includes feet which support the box 2 having opaque walls but provided at its upper portion with a peripheral frame 2a supporting the light-permeable plate 3 which may simply be a transparent plate made of glass, for example. This light-permeable plate serves to support the article which is to be illuminated, such as the sheet through which light is to pass and which is to form the object to be photographed on microfilm. The light-permeable plate 3 is matted to provide a better distribution of the light which comes from the interior of the box 2. Adjacent to but beneath the frame 2a, the box 2 carries in its interior a horizontal peripheral frame 4 which supports a second light-permeable plate 5, this plate serving to further distribute the light by diffusing the latter and contributing to an increase in the uniformity of the light distribution.

The box 2 is furthermore provided with a baseplate 6 in the interior of the box 2, this plate plate 6 being common to and serving to carry a plurality of guide sleeves 7 which are fixed to the baseplate 6 extending vertically through the latter in the manner shown in the drawing, the plate 6 as well as the plates 3 and 5 all being horizontal. A plurality of rods 8 are respectively slidable through the guide sleeves 7, and these rods 8 are respectively carry lamp sockets 9. The guide rods 8 can be fixed at selected elevations in the sleeves 7 by the setscrews 10, so that in this way an adjusting means is provided for adjusting the elevation of the lamp sockets 9.

These lamp sockets 9 receive the lamps 11 which form the light sources and which may, for example, take the form of 15-watt auto lamps. These lamps 11 which thus form the light sources have their curved ends 11a, which are directed toward the plate 3, provided with mirrored surfaces so that these ends 11a form a plurality of reflectors shielding the light against traveling directly from the lamps to the plate 3 and instead reflecting the light back to the reflecting wall 15. Thus, the reflectors 11a prevent direct illumination of the light-distributing plates 3 and 5 by the filaments of the lamps. Current is supplied to the lamps by way of flexible conductors 12 extending through axial bores of the rods 8.

The baseplate 6 carries upstanding pins 14 which support the horizontal reflecting wall 15. This wall 15 is formed with openings 15a through which the lamps 11 respectively extend and the extent to which the lamps extend to the side of wall 15 directed downwardly away from the plate 3 depends upon the adjustment of the elevation of the sockets 9 in the manner described above. The upper surface of the wall 15 is provided with a white-matted coating in the form of a suitable lacquer so that in this way the upper surface of the wall 15 will reflect light up toward the plates 5 and 3. Thus, because of this particular type of reflecting surface provided at the wall 15, the light will be reflected back to the plates 3 and 5 to radiate toward the latter in diffuse form.

The amount of light which is radiated back to the plates 3 and 5 will, therefore, depend to a large degree on the particular adjusted elevation of the lamps 11 with respect to the wall 15 and, in particular, according to the adjusted elevation of the reflectors 11a with respect to the wall 15. Thus, in the case where a particular lamp 11 extends to a small extent down through the wall 15, then practically all of the light from the lamp filament and from the inner surface of the reflector 11a engages the upper surface of the reflecting wall 15 to be directed from the latter to the plates 3 and 5. However, upon lowering of a lamp 11 so that it extends only to a smaller extent upwardly through the wall 15, only a fraction of the light from the reflector 11a will reach the upper surface of the wall 15, while the remainder of the light will simply radiate down through the opening 15a toward the bottom of the box. In the same way, the greatest part of the direct light from the lamp filament, which is situated in this case in part close to the upper surface of the wall 15 and in part beneath the latter, will provide light traveling only beneath the wall 15 in the space in the box beneath this wall. During further lowering of lamp 11, none of the light reflected down from the reflector 11a thereof will be reflected upwardly from the reflecting surface of the wall.

It is apparent, therefore, that with this arrangement of the invention there is an extremely large range of adjustment. Each one of the lamps 11 can be independently adjusted so as to provide a required intensity of illumination for a localized part of the sheet which is to be illuminated. Thus, the various areas of the sheet can be very precisely illuminated by the individual adjustments of the lamps to achieve in this way and in accordance wit the lamp adjustments, either a maximum flow of light to provide the greatest possible illumination of a part of the sheet or if required, the adjustment can be made so as to provide almost complete lack of illumination of a localized part of the sheet. In order to make the best possible use of the lamps when adjusting for maximum illumination, the parts of the lamps which are directed away from the reflectors 11a thereof are provided with additional circular reflecting rings 16.

In order to be able to manually adjust the lamp, there is situated beneath the baseplate 6 an opening 2b formed in the bottom wall of the box 2, giving access to the space therein beneath the baseplate 6, and a removable cover plate 17 normally covers the opening 2b, so that upon removal of the cover 17 free access may be had to space beneath the baseplate 6 for adjusting the elevation of the lamps. Thus, from the opening 2b, it is possible to loosen the setscrews 10 and to grasp various lamps at their guide rods 8, which then enables the individual lamps to be individually adjusted. A suitable light meter, which can measure light at a given point of extremely small area, is provided over each lamp during its adjustment to achieve the required light intensity. The top surface of the plate 3 can be provided with suitable coordinates so as to provide in both coordinate directions of the surface which supports the sheet to be photographed a light distribution which will provide a uniform density for the negative.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In an illustrating assembly, comprising in combination,
   a light-permeable plate adapted to carry an article which is to be illuminated,
   a wall having a plurality of openings situated on one side of said plate and having a light-reflecting surface directed toward said plate for reflecting the light to the latter to pass therethrough and illuminate said article,
   a corresponding plurality of lamps adjustably mounted in said assembly and adapted to extend at least in part through said plurality of openings,
   each lamp of said plurality of lamps having an end directed toward said plate, said end including reflecting means for reflecting at least a portion of the light from said lamp onto said reflecting surface, and
   adjusting means mounted in said assembly and operatively connected to said plurality of lamps for adjusting the positions of the latter relative to said wall.

2. The combination of claim 1 and wherein said lamps respectively have regions directed away from said reflecting means, and additional reflectors respectively carried by said lamps at said regions thereof.

3. The combination of claim 1 and wherein said lamps respectively having ends directed toward said plate, situated between the latter and said wall, and having mirrored surfaces forming said reflecting means.

4. The combination of claim 3 and wherein a plurality of sockets respectively carrying said lamps, said adjusting means including elongated rods, fixed to and extending from said sockets, a plurality of a guide sleeves through which said rods slidably extend, releasable fasteners for releasably fastening said rods in adjusted positions in said sleeves, and a common base member common to said sleeves and carrying the latter at the side of said wall opposite from said plate.

5. The combination of claim 1 and wherein said wall has directed toward said plate a reflecting, white mat surface.

6. The combination of claim 1 and wherein said plate is horizontally arranged and situated over said wall, said wall also being horizontal and said lamps being vertically adjustable.